Oct. 16, 1951     D. TANN     2,571,393
PULLEY
Filed Nov. 1, 1946
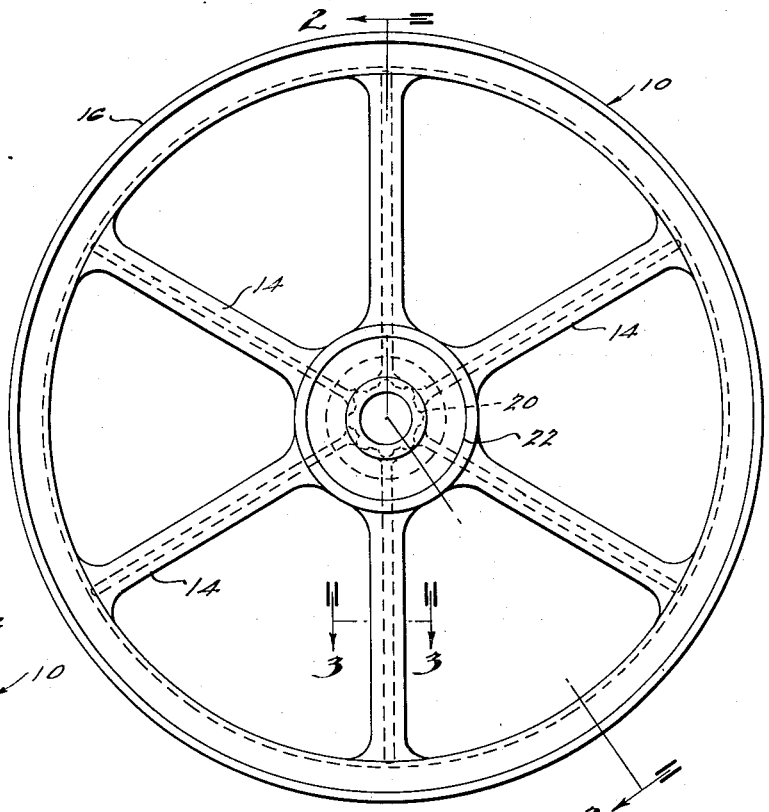
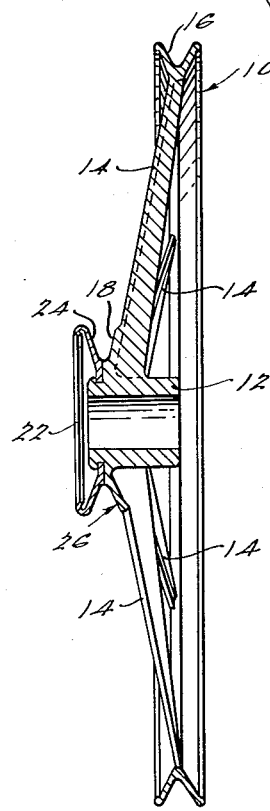
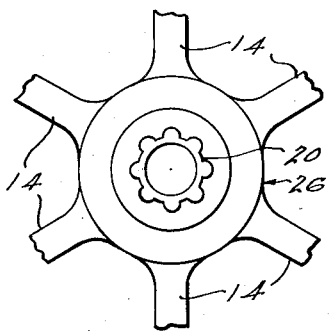
INVENTOR.
David Tann.
BY
Harness, Dickey & Pierce
ATTORNEYS.

Patented Oct. 16, 1951

2,571,393

UNITED STATES PATENT OFFICE 2,571,393

PULLEY

David Tann, Detroit, Mich.

Application November 1, 1946, Serial No. 707,172

6 Claims. (Cl. 74—230.4)

This invention relates to pulleys, and more particularly to multiple step pulleys.

The principal objects of the invention are: to provide a multiple step pulley which is simple and durable in construction, economical of manufacture and assembly, and reliable in operation; to provide an improved pulley of the type in which a plurality of belt tracks of different material are supported on a single hub; to provide an improved pulley in which the rim supporting structure extending outwardly from the hub lies in the surface of an imaginary shallow cone, the axis of which is coincident with the axis of the hub, whereby a single hub may be employed to support belt tracks in spaced axial positions; to provide a two-step pulley having at least one portion of a belt track constructed as a separate stamping which is secured to the hub or adjacent structure to form with a portion thereof a complete belt track; and to provide a simple and durable two-step pulley formed of two parts which may be permanently secured together, one of which parts provides a unitary hub and belt track supporting structure and the other of which provides a portion of at least one belt track.

Other and more detailed objects will become apparent from a consideration of the following specification, the appended claims and the accompanying drawing, wherein:

Figure 1 is an elevational view of a pulley constructed according to the invention;

Fig. 2 is a sectional view of the structure illustrated in Fig. 1, taken substantially along the line 2—2 thereof;

Fig. 3 is an enlarged sectional view of the structure illustrated in Fig. 1, taken substantially along the line 3—3 thereof; and Fig. 4 is a broken elevational view showing the hub structure prior to assembly.

Referring to the drawings, the pulley comprises a wheel, generally indicated at 10, which is preferably die cast of any suitable metal or alloy thereof. The wheel 10 includes a generally cylindrical hub 12 for mounting the pulley on a shaft. At its outer periphery, the wheel 10 is formed to provide an annular V-shaped belt track 16 which is integral with and supported by a plurality of spokes 14 integrally formed on the hub 12. The spokes 14 are preferably T-shaped in cross section, as illustrated in Fig. 3, and are disposed at an angle to a radial plane to lie in the surface of an imaginary shallow cone coaxial with the hub 12, as is best illustrated in Fig. 2.

The sloping spokes 14 space the belt track 16 axially of the hub 12 from the integral connection of the inner ends of the spokes 14 to the hub. At the integral connection of the spokes and hub, and on the side thereof axially remote from a plane through the belt track 16, the wheel 10 is formed to provide a generally conical annular surface 18 which constitutes one side wall of a second V-shaped belt track, generally indicated at 26, which is of smaller diameter than the belt track 16 and is spaced axially therefrom. The external surface of the hub 12, extending axially beyond the annular surface 18 and in a direction away from the spokes 14, is provided with a series of axially extending scallops 20 which are best illustrated in Figs. 1 and 4. The outer side wall of the belt track 26 is formed by a member 22 of truncated conical form. The member 22 is formed with a central complementary scalloped opening adapted to mate with the scallops 20 and cooperate therewith and prevent relative rotation between the member and the hub. The member 22 is preferably formed by stamping and has an inwardly presenting conical surface 24 disposed adjacent to the surface 18, which cooperates with the latter to define the belt track 26. The member 22 is secured upon the wheel 10 by swaging, peening or rolling the outwardly extending end of the hub over the outer face of the ring.

The invention has been illustrated and described in detail in connection with a two-step pulley, but it will be apparent that the wheel may be modified by the addition of a number of the members 24 of different diameters to furnish any number of steps or tracks desired. It will also be apparent that any desired axial spacing between the belt tracks may be effected by varying the angle between the spokes and the axis of the hub or by otherwise modifying the belt track supporting structure.

What is claimed is:

1. A pulley comprising a unitary member of cast material including a unitary hub and an annular portion having a part of a belt track thereon, and a sheet metal member secured in fixed relation against a shoulder on said unitary hub in position to cooperate with said annular portion to complete said belt track when the end of the hub adjacent to said shoulder is flanged over said member.

2. A pulley comprising a unitary member having one-half of a belt track extending from a unitary hub, a sheet metal member providing the other half of said belt track, cooperating means comprising recesses and projections on said members providing positive engagement therebetween preventing relative rotation of said members, and a flange for positively retaining said members against axial displacement.

3. The combination in a multiple pulley, a casting embodying a unitary hub having one-half of a pulley track and spokes extending therefrom supporting a pulley of larger diameter than said one-half of a pulley track, and a sheet metal member comprising the other half of said pulley track supported solely by said hub.

4. A multiple step pulley comprising a unitary member including a unitary hub having one-half of a pulley track thereon, a plurality of spokes extending from said hub and pulley track at an angle to a radial plane through said hub, on the ends of which a belt track is supported, and a second member secured to said unitary member and having an annular surface forming the other half of said second belt track which is spaced axially from said first named belt track.

5. A multiple step pulley comprising a unitary cast member including a unitary hub having a plurality of spokes extending therefrom at a slight angle to a radial plane through said hub and having a belt track supported on said spokes, said hub also having an annular portion forming one-half of a second belt track, a sheet metal member forming the other half of said second belt track, and means for supporting said sheet metal member solely on said hub.

6. A pulley comprising a unitary hub, a plurality of spokes carried by said hub and disposed to lie in the surface of a shallow cone coaxial with and sloping from said hub, and a pair of axially spaced belt tracks of different diameters supported on said spokes and hub, one side of the belt track of smaller diameter lying substantially on the sloping adjacent walls of the spokes, the ends of the spokes extending to the center of the larger belt track on the inner diameter thereof.

DAVID TANN.

REFERENCES CITED

The following references are of record in the file of this patent:

UNITED STATES PATENTS

| Number | Name | Date |
|---|---|---|
| 1,266,579 | Garcelon | May 21, 1918 |
| 1,822,826 | Schwemlein | Sept. 8, 1931 |
| 1,887,279 | Bendit | Nov. 8, 1932 |

FOREIGN PATENTS

| Number | Country | Date |
|---|---|---|
| 19,611 | Great Britain | 1914 |